US010267178B2

(12) United States Patent
Doebler et al.

(10) Patent No.: US 10,267,178 B2
(45) Date of Patent: Apr. 23, 2019

(54) STEAM TURBINE STAGE MEASUREMENT SYSTEM AND A METHOD

(71) Applicant: General Electric Technology GmbH, Baden (CH)

(72) Inventors: Rolf Doebler, Mannheim (DE); Michaela Ehrich, Mannheim (DE); Thomas Schreier, Baden (CH); Steffen Lehmann, Baden (CH)

(73) Assignee: General Electric Company, Schenectady, NY (US)

( * ) Notice: Subject to any disclaimer, the term of this patent is extended or adjusted under 35 U.S.C. 154(b) by 182 days.

(21) Appl. No.: 15/255,404

(22) Filed: Sep. 2, 2016

(65) Prior Publication Data

US 2017/0067360 A1    Mar. 9, 2017

(30) Foreign Application Priority Data

Sep. 9, 2015  (EP) .................................... 15184436

(51) Int. Cl.
| | |
|---|---|
| *F01D 21/04* | (2006.01) |
| *G01B 7/14* | (2006.01) |
| *F01D 21/00* | (2006.01) |
| *F01D 5/02* | (2006.01) |
| *F01D 5/12* | (2006.01) |
| *F01D 9/04* | (2006.01) |
| *F01D 25/24* | (2006.01) |
| *G01M 15/14* | (2006.01) |

(52) U.S. Cl.
CPC ............. *F01D 21/003* (2013.01); *F01D 5/02* (2013.01); *F01D 5/12* (2013.01); *F01D 9/041* (2013.01); *F01D 21/04* (2013.01); *F01D 25/24* (2013.01); *G01M 15/14* (2013.01); *F05D 2220/31* (2013.01); *F05D 2260/83* (2013.01); *F05D 2270/80* (2013.01); *F05D 2270/821* (2013.01); *F05D 2300/5021* (2013.01); *G01B 7/14* (2013.01)

(58) Field of Classification Search
CPC ....................................................... F01D 21/04
See application file for complete search history.

(56) References Cited

U.S. PATENT DOCUMENTS

| | | | | |
|---|---|---|---|---|
| 2,392,209 A | * | 1/1946 | Wilson ..................... | F01D 21/04 33/655 |
| 3,709,637 A | * | 1/1973 | Petrie ...................... | F01D 5/026 415/134 |
| 4,502,046 A | * | 2/1985 | Wonn ...................... | F01D 21/04 340/679 |
| 4,644,270 A | | 2/1987 | Oates et al. | |

(Continued)

FOREIGN PATENT DOCUMENTS

EP    2821593 A1    1/2015

*Primary Examiner* — Leslie J Evanisko
*Assistant Examiner* — Ruben C Parco, Jr.
(74) *Attorney, Agent, or Firm* — James W. Pemrick

(57) ABSTRACT

Embodiments of the present invention relate to the calculation of an absolute and relative axial displacement in a steam turbine between a stationary vane row and a rotating blade row steam turbine. This is achieved by using a measurement signal of an outer casing absolute axial expansion sensor, a measurement signal of an inner to outer casing differential axial expansion sensor and a measurement signal for a rotor to outer casing differential axial expansion sensor.

20 Claims, 1 Drawing Sheet

(56) References Cited

U.S. PATENT DOCUMENTS

| | | | |
|---|---|---|---|
| 4,876,505 A | 10/1989 | Osborne | |
| 4,967,552 A * | 11/1990 | Kumata | F01D 5/08 |
| | | | 415/115 |
| 5,388,960 A * | 2/1995 | Suzuki | F01D 25/12 |
| | | | 415/108 |
| 2004/0204900 A1* | 10/2004 | Namburi | F01D 11/08 |
| | | | 702/136 |
| 2006/0239813 A1 | 10/2006 | Shah et al. | |
| 2008/0019821 A1* | 1/2008 | Narita | F01D 11/02 |
| | | | 415/103 |
| 2010/0100248 A1* | 4/2010 | Minto | F01D 11/20 |
| | | | 700/287 |
| 2013/0094940 A1 | 4/2013 | Montgomery | |
| 2013/0149117 A1 | 6/2013 | Hori et al. | |

* cited by examiner

STEAM TURBINE STAGE MEASUREMENT SYSTEM AND A METHOD

TECHNICAL FIELD

The present disclosure relates generally to steam turbines and more specifically to steam turbine instrumentation and methods for the estimate of axial expansion.

BACKGROUND

The outer shell of a steam turbine is generally called the outer casing. Within the outer casing is typically an inner casing that supports stationary vane rows and a rotor that supports rotating blade rows, wherein the space formed between the inner casing and the rotor is an expansion flow path. As the rotor, inner casing, and outer casing are exposed to different temperatures and further may be constructed of different materials with differing thermal expansion coefficients, expansion rates of these components may differ. As a result, it is typical to tolerate large axial clearances between blade rows and vane rows in order to take into account this differing thermal expansion, which is most pronounced when the steam turbine is exposed to different loads or else changes operating stated from standby mode to running mode.

However, larger than required axial clearances between blade rows and vane rows may result in a reduction of the efficiency of the turbine. This is, however, preferably to the contrary where contact is made between components. The problems caused by large axial clearances can in part be addressed through measurement. For example, measuring the clearance between a plurality of turbine blade row shroud segments can be done using proximity sensors. This allows an operator to take action if a critical clearance condition occurs. Other than the discussed measurement means, other known blade row tip clearance measurement methods used in gas turbines maybe adapted for use in steam turbines. Such measurement methods include fibre optic laser Doppler distance sensors, as well as other sensors such as capacitive probes, inductive probes, optical measurement systems based on triangulation, optical coherence tomograph and time-of-flight measurements. While these solutions may provide a desirable means of alerting an operator to the approach of a potentially undesirable condition, the corrective action, which typically may result in a change in load, typically requires the steam turbine to be operated away from a desired operating point.

Another solution may include a method and an arrangement for aligning an inner casing of a steam turbine by means of adjustable mounts. During operation of the steam turbine the axial clearance between the inner casing and rotor is measured and then the axial clearance between the rotor and the inner casing is adjusted.

BRIEF DESCRIPTION

Provided is a system and method for estimating axial displacement in a stage of a steam turbine that enables continuous, real-time measurements that can either provide an alert if allowable tolerances are exceeded or else enable operational optimisation.

The disclosure is based on the general idea of providing a means to dynamically estimate axial clearance between a moving blade row and a stationary vane row of a steam turbine stage. This is achieved by applying numerical methods to the output of at least three expansion sensors that measure either or both absolute or relative axial expansion of components of the steam turbine in order to estimate differential axial expansion between a moving blade row and a stationary vane row. Based on an axial clearance of the turbine stage at a first set of conditions, the estimated differential axial expansion can be used to further estimate actual axial displacement between a nominal stationary vane row and rotating blade row of a turbine stage.

An aspect provides a steam turbine measurement system including a steam turbine with an outer casing, having a first end and a second end, an inner casing encasing the outer casing, a support arm fixing the inner casing to the outer casing in an axial direction, a vane row fixed to the inner casing, a rotor extending through the outer casing from the first end to the second end and through the inner casing so as to form a flow passage between the rotor and the inner casing, and a blade row carried on the rotor and extending into the flow passage, wherein the vane row and the blade row form a stage. The steam turbine further includes an axial displacement measurement system including an outer casing absolute axial expansion sensor, an inner to outer casing differential axial expansion sensor, a rotor to outer casing differential axial expansion sensor, and a computer. The computer is configured to receive measurement signals from the outer casing absolute axial expansion sensor, the inner to outer casing differential axial expansion sensor and the rotor to outer casing differential axial expansion sensor and, based on these sensors calculate either or both an absolute or relative axial displacement between the vane row and the blade row.

In this context a computer is not limited to a sophisticated computing device but includes any known electronic means of calculation including a module of a digital control system or a calculator wherein the computer may be configured to receive sensor signals by hardwire inputs from the sensors, wireless data transmission or an input device that enables manual transfer of sensor data into the computer.

Another aspect provides a method for calculating an axial displacement in a steam turbine between a stationary vane row and a rotating blade row that form a stage of the steam turbine. The method includes the steps of:

a) providing a steam turbine with an outer casing having a first end and a second end, an inner casing encasing the outer casing, a support arm fixing the inner casing to the outer casing in an axial direction a vane row fixed to the inner casing, a rotor extending through the outer casing from the first end to the second end and through the inner casing so as to form a flow passage between the rotor and the inner casing, and a blade row carried on the rotor and extending into the flow passage, wherein the vane row and the blade row form a stage;

b) calculating an axial expansion at the vane row by, calculating an outer casing axial expansion at the stage using an estimated outer casing axial expansion measurement, calculating an axial expansion of the inner casing between the support arm and a point of the inner casing between the support arm and the second end, using the calculated outer casing axial expansion and an estimated inner to outer casing differential axial expansion, and using the calculated axial expansion of the inner casing to calculate the axial expansion at the vane row from the calculated axial expansion of the inner casing; and c) calculating an axial expansion at the blade row by, calculating an axial expansion of the rotor from the estimated outer casing axial expansion and an estimated axial expansion of the rotor, and then calculating the axial expansion at the blade row using the calculated axial expansion of the rotor.

An aspect the steam turbine further includes a vane carrier fixed to the inner casing wherein the vane row is fixed to the inner casing by the vane carrier.

In an aspect, after steps a), b), and c) a relative axial displacement of the stage is calculated from a difference between the axial expansion at the vane row of step b) and the axial expansion at the blade row of step c).

In further aspect, in addition to steps a), b) and c) the method includes establishing a zero datum point for the zero axial expansion of the vane row and a datum point for the zero axial expansion of the blade row. These datum points are then used to calculate an absolute axial clearance of a stage by subtracting a difference between the datum points, the calculated relative axial displacement of the stage row.

Further aspects include one or more of the following features: using the calculated axial expansion of the inner casing to calculate the axial expansion at the vane row from the calculated axial expansion of the inner casing includes a multiplication of the calculated axial expansion of the inner casing by a factor that is a function of steam turbine load, the estimating of the outer casing axial expansion using an absolute an outer casing absolute axial expansion sensor, the outer casing axial expansion measurement estimated at the first end, the estimating of the inner to outer casing differential axial expansion using an inner to outer casing differential axial expansion sensor, the estimating of the axial expansion of the rotor using an inner to outer casing differential axial expansion sensor, the point of the inner casing between the support arm and the second end is radially adjacent the stage, and the calculated axial expansion of the rotor is an absolute axial expansion of the rotor between the first end and the second end.

It is a further object of the invention to overcome or at least ameliorate the disadvantages and shortcomings of the prior art or else provide a useful alternative.

Other aspects and advantages of the present disclosure will become apparent from the following description, taken in connection with the accompanying drawings which by way of example illustrate exemplary embodiments of the present invention.

BRIEF DESCRIPTION OF THE DRAWINGS

By way of example, embodiments of the present disclosure are described more fully hereinafter with reference to the accompanying drawing, in which.

DETAILED DESCRIPTION

Figure 1:
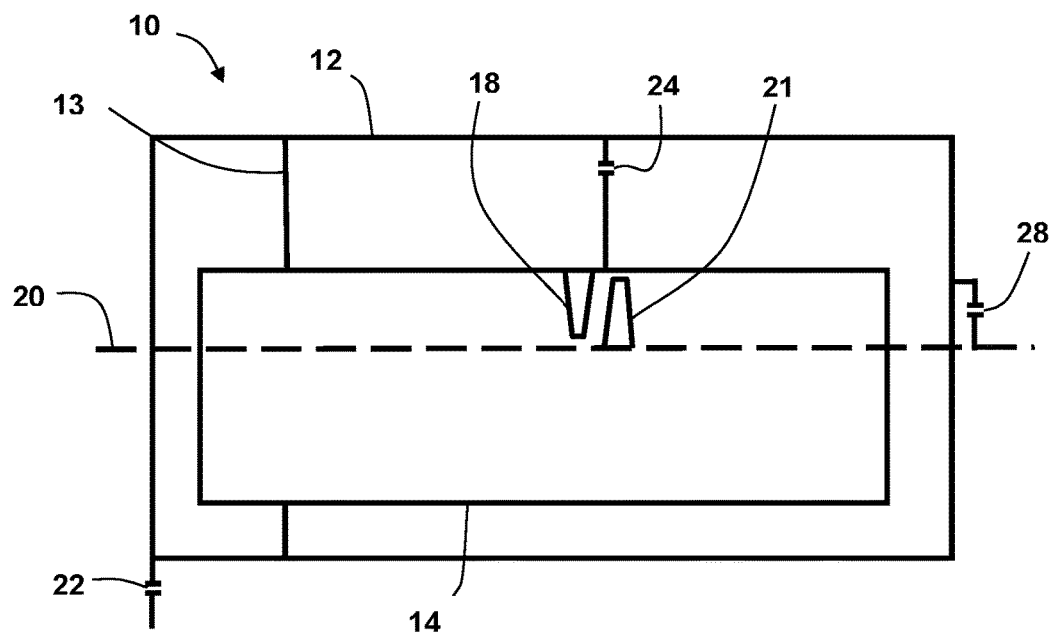
FIG. 1 is a schematic of a steam turbine to which an exemplary embodiment of the disclosure has been applied.

Exemplary embodiments of the present disclosure are now described with references to the drawings, wherein like reference numerals are used to refer to like elements throughout. In the following description, for purposes of explanation, numerous specific details are set forth to provide a thorough understanding of the disclosure. However, the present disclosure may be practiced without these specific details, and is not limited to the exemplary embodiments disclosed herein.

In this specification reference is made to absolute, differential and relative expansion measurement. Absolute axial expansion measurement is taken to be a differential location measurement between a point whose location is either not affected or negligibly affected by temperature and a location of a second point that is directly affected by temperature, a differential axial expansion measurement is taken to mean a measurement in the change of location between two point whose location are both affected by temperature, while a relative expansion measurement is taken to mean a measurement between a point whose location is directly affected by temperature and a point whose location may or may not be directly affect by temperature.

In an exemplary embodiment shown in FIG. 1, a steam turbine includes an outer casing 12, an inner casing 14 encompassed by the outer casing 12 and fixed to the outer casing 12 in the axial direction by a support arm 13, a vane row 18 carried by the inner casing 14, a rotor 20 extending through the outer casing 12 and inner casing 14 so as to form a flow passage between the rotor 20 and the inner casing 14, and a moving blade row 21 carried by the rotor 20 in the flow passage. In such a steam turbine 10, a turbine stage is defined as a combination of an upstream vane row 18 with a downstream blade row 21.

An exemplary embodiment shown in FIG. 1 includes a minimum of three expansion sensors, including an outer casing absolute axial expansion sensor (OC-Abs) 22, an inner to outer casing differential axial expansion sensor (IN/OC-DE1) 24, and a rotor to outer casing differential axial expansion sensor (R/OC-DE) 28.

The outer casing absolute axial expansion sensor 22 is located at a first axial end of the outer casing 12 and is configured to measure the absolute axial expansion of the outer casing 12.

The inner to outer casing differential axial expansion sensor 24 is located radial adjacent a turbine stage to be measured. As the inner casing 14 is fixed to the outer casing 12 by a support arm 13 that axially fixes the inner casing 14 to the outer casing 12 the axial displacement measured by the inner to outer casing differential axial expansion sensor 24 is the displacement of the inner casing between the measurement point and the support arm 13. While it may be possible to estimate the axial displacement of adjacent stages from this sensor, the further the stage is offset in the axial direction from the inner to outer casing differential axial expansion sensor on 24 location, the less accurate the estimate. Nonetheless, the circumferential disposition of the inner to outer casing differential axial expansion sensor has negligible influence on the accuracy of the of the displacement calculation.

The rotor to outer casing differential axial expansion sensor 28 is located at a second axial end of the outer casing 12 distal from the first axial end and is further configured to measure differential axial expansion in the axial direction.

Each of the expansion sensors may be of any known type capable of measuring expansion of greater than 0.1 mm at conditions typically found in and around a steam turbine 10. Such expansion sensors include, but are not limited to, sensors based on induction technology.

In an exemplary embodiment, an axial displacement stationary vane rows 18 and rotating blade rows 21 of a fifth stage of a steam turbine are calculated using an outer casing absolute axial expansion sensor 22, an inner to outer casing differential axial expansion sensor 24 located radially adjacent the fifth stage of the steam turbine 10 and rotor to outer casing differential axial expansion sensor 28. In this exemplary embodiment, it is assumed that expansion occurs from the direction of the first axial end, where the outer casing absolute axial expansion sensor 22 is located, to the second axial end, where the outer casing differential axial expansion sensor 28 is located. An exemplary method follows.

As a first step it is necessary to estimate the expansion of the inner casing 14 near the location of the fifth stage and thus the axial expansion of a vane row 18 that forms part of the fifth stage. First, the absolute outer casing expansion (OC-abs) is calculated at this point using equation 1 wherein K1 is the ratio of axial length between the outer casing absolute axial expansion sensor 22 and the fifth stage of the steam turbine 10 divided by the axial length between the outer casing absolute axial expansion sensor 22 and the outer casing differential axial expansion sensor 28. K1 may further be corrected for casing distortion due to, for example, pressure distortion or non-linear thermal expansion.

$$OC\text{-}absstag5 = K1 \times OC\text{-}abs(22) \qquad \text{eq. 1}$$

The next step is to add the axial expansion of the outer casing to inner casing 14 relative to the outer casing 12 between the support arm 13 and the inner to outer casing differential axial expansion sensor 24. In this way the absolute axial expansion of the inner casing near the fifth stage (IC-absstag 5) can be estimated as shown in equation 2.

$$IC\text{-}absstag5 = OC\text{-}absstag5 + IN/OC\text{-}DEstag5(24) \qquad \text{eq. 2}$$

From the result of equation 2 is it then possible to estimate the axial displacement of vane rows of the fifth stage (VCstg5-abs) by multiplying the absolute axial expansion of the inner casing (IC-absstag5) by a factor (K2) that takes into consideration axial displacement of the outer casing differential axial expansion sensor 24.

$$VCstg5\text{-}abs = K2 \times IC\text{-}absstag5 \qquad \text{eq. 3a}$$

As a second step or other step, the axial displacement of the rotating blade row is estimated.

Firstly, the absolute axial displacement of the rotor (R-abs) between the axial extremes of the outer casing is estimated using an outer casing absolute axial expansion sensor 22 and the outer casing differential axial expansion sensor 28 as shown in equation 5.

$$R\text{-}abs = OC\text{-}abs(22) + R/OC\text{-}DE(28) \qquad \text{eq. 4}$$

Next, the absolute displacement of the rotor at the fifth stage (R5-abs) is estimate in equation 5 by applying a factor K3 to the absolute axial displacement of the rotor (R-abs). Factor K3 is the ratio of axial length between the outer casing absolute axial expansion sensor 22 and the rotating blade row of stage 5 of the steam turbine 10 divided by the axial length between the outer casing absolute axial expansion sensor 22 and the outer casing differential axial expansion sensor 28. As the temperature profile of the rotor 20 while in operation is not uniform and further the rotor may consist of more than one material having different coefficients of thermal expansion factor K3 may be adjusted from the pure geometric ratio taken at one set of conditions by empirical means that adjust for predicted or measured operating conditions.

$$R5\text{-}abs = K3 \times R\text{-}abs \qquad \text{eq. 5}$$

In an exemplary embodiment, relative axial displacement is then calculated by subtracting the rotating blade row axial expansion obtained in equation 5 from the stationary vane row axial expansion obtained from equation 3a.

$$DE5 = R5\text{-}abs - VCstag5\text{-}abs \qquad \text{eq. 6}$$

In a further exemplary embodiment, absolute axial clearance is calculated by first defining datum values for the moving blade row axial displacement (R-5absdat) and the stationary vane row axial displacement (VCstage5-absdat). As an example, the datum values may be estimated when the steam turbine is unloaded but preheated to an operating temperature. Absolute axial displacement can then be estimated by using equation 7 in which the datum values are incorporated into equation 6.

$$DE\text{-}5 = (R5\text{-}absdat - VCstag5\text{-}absdat) - (R5\text{-}abs - VCstag5\text{-}abs\text{-}) \qquad \text{eq. 7}$$

Figure 2:
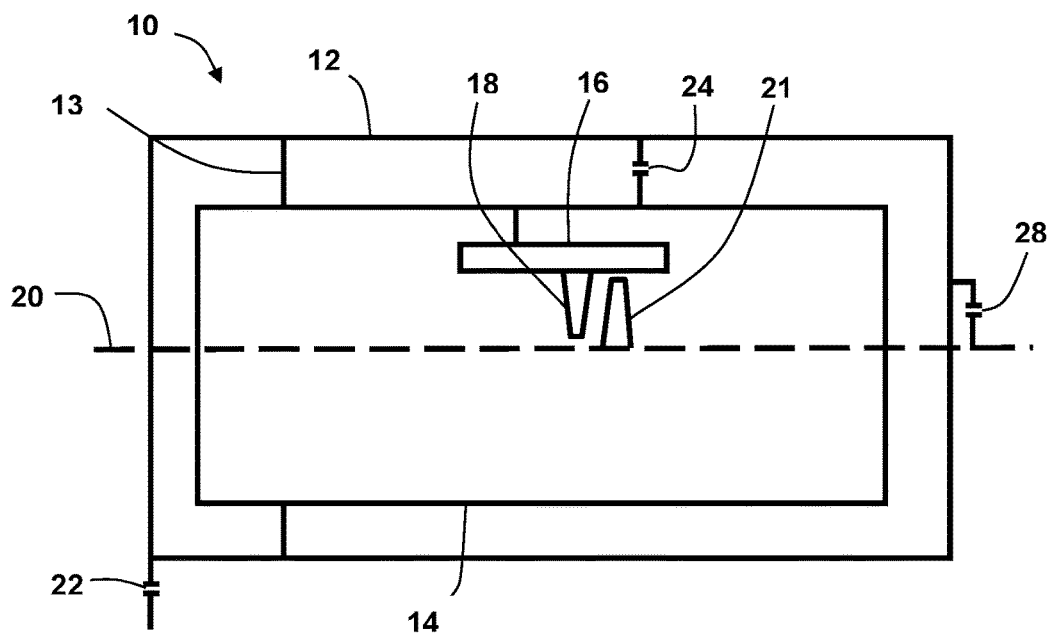
FIG. 2 is a schematic of a steam turbine with a vane carrier to which an exemplary embodiment of the disclosure has been applied.

In an exemplary embodiment shown in FIG. 2, the vane row 18 is supported by the inner casing 14 by means of a vane carrier 16. In order to estimate stage displacement it is necessary to take into account the thermal expansion of the vane carrier 16, This is done through a modified equation 3b which used the result of equation 2 where the axial displacement of vane rows of the fifth stage (VCstg5-abs) is estimated is multiplying by the absolute axial expansion of the inner casing (IC-absstag5) by a factor (Fbc1(x)).

$$VCstag5\text{-}abs = Fbc1(x) \times IC\text{-}absstag5 \qquad \text{eq. 3b}$$

As the vane carrier 16 is exposed to a varying thermal load along the axial length of the vane carrier 16 it was found that a linear function based on length of the vane carrier 16 does not provide reliable results. As a result, in an exemplary embodiment the factor (Fbc1(x)) is empirically based on load. Empirical data, which is dependent on both machine configuration and operating conditions, may be either obtained experimentally or else with the assistance of known simulation techniques.

The vane row axial displacement (VCstage5-abs) may then be used in equations 6 and 7 to estimate relative axial displacement of the stage and absolute axial clearance of the stage.

Although the disclosure has been herein shown and described in what is conceived to be the most practical exemplary embodiments, it will be appreciated that the present disclosure can be embodied in other specific. For example, exemplary methods may be applied to additional vane carriers 16 as well as additional sensors by be used, for example sensor measuring expansion at different circumferential locations. As such, the inner to outer casing sensor used for the measurement of axial movement of the vane row 18 and the blade row 21 may be either different sensors or else the combination of multiple sensors. The presently disclosed embodiments are therefore considered in all respects to be illustrative and not restricted. The scope of the disclosure is indicated by the appended claims rather that the foregoing description and all changes that come within the meaning and range and equivalences thereof are intended to be embraced therein.

What is claimed is:

1. A method for calculating an axial displacement in a steam turbine between a stationary vane row and a rotating blade row that form a stage of the steam turbine, the method comprising the steps of:
 a) providing a steam turbine with:
  an outer casing, having a first end and a second end; an inner casing encased by the outer casing;
  a support arm fixing the inner casing to the outer casing in an axial direction; a vane row fixed to the inner casing;
  a rotor extending through the outer casing, from the first end to the second end, and through the inner casing, so as to form a flow passage between the rotor and the inner casing; and a blade row carried on the rotor and extending into the flow passage, wherein the vane row and the blade row form a stage;

b) calculating an axial expansion at the vane row by:

calculating an absolute outer casing axial expansion at the stage using an estimated outer casing axial expansion measurement;

calculating an absolute axial expansion of the inner casing between the support arm and a point of the inner casing between the support arm and the second end using the calculated absolute outer casing axial expansion and an estimated inner to outer casing differential axial expansion; and using the calculated absolute axial expansion of the inner casing to calculate the axial displacement at the vane row from the calculated axial expansion of the inner casing, c) calculating an axial displacement at the blade row by:

calculating an axial expansion of the rotor from the estimated outer casing axial expansion measurement and a rotor to outer casing differential axial expansion measurement; and calculating the axial displacement at the blade row by applying a factor to the calculated axial expansion of the rotor, d) after steps a), b), and c), calculating a relative axial displacement of the stage from a difference between the axial expansion at the vane row of step b) and the axial displacement at the blade row of step c); and providing an alert if allowable tolerances are exceeded.

2. The method of claim 1, further including:

establishing a datum point for the axial expansion of the vane row and a datum point for the axial expansion of the blade row; and the additional step of:

e) calculating an absolute axial clearance of a stage by subtracting from, a difference between the datum point of the vane row and the datum point of the blade row, the relative axial expansion of the stage of step d).

3. The method of claim 1, wherein:

step a) further includes providing a vane carrier, wherein the vane row is fixed to the inner casing by the vane carrier.

4. The method of claim 3, wherein in step b) using the calculated axial expansion of the inner casing to calculate the axial expansion at the vane row from the calculated axial expansion of the inner casing, includes a multiplication of the calculated axial expansion of the inner casing by a factor ($Fbc1(x)$) that is a function of steam turbine load.

5. The method of claim 1, wherein the estimating of the outer casing axial expansion uses an outer casing absolute axial expansion sensor.

6. The method of claim 1, wherein in step b) and step c) the outer casing axial expansion measurement is estimated at the first end.

7. The method of claim 1, wherein the estimating of the inner to outer casing differential axial expansion uses an inner to outer casing differential axial expansion sensor.

8. The method of claim 1, wherein the estimating of the axial expansion of the rotor uses a rotor to outer casing differential axial expansion sensor.

9. The method of claim 1, wherein in step b) the point of the inner casing between the support arm and the second end is radially adjacent the stage.

10. The method of claim 8, wherein in step c) the calculated axial expansion of the rotor is an absolute axial expansion of the rotor between the first end and the second end.

11. A method for calculating an axial displacement in a steam turbine between a stationary vane row and a rotating blade row that form a stage of the steam turbine, the steam turbine comprising an outer casing having a first end and a second end, an inner casing encased by the outer casing, a support arm fixing the inner casing to the outer casing in an axial direction, a vane row fixed to the inner casing, a rotor extending through the outer casing, from the first end to the second end, and through the inner casing, so as to form a flow passage between the rotor and the inner casing, and a blade row carried on the rotor and extending into the flow passage, wherein the vane row and the blade row form a stage, the method comprising the steps of:

a) calculating an axial expansion at the vane row by:

calculating an outer casing axial expansion at the stage using an estimated outer casing axial expansion measurement;

calculating an axial expansion of the inner casing between the support arm and a point of the inner casing between the support arm and the second end using the calculated outer casing axial expansion and an estimated inner to outer casing differential axial expansion; and using the calculated axial expansion of the inner casing to calculate the axial expansion at the vane row from the calculated axial expansion of the inner casing, b) calculating an axial expansion at the blade row by:

calculating an axial expansion of the rotor from the estimate outer casing axial expansion and a rotor to outer casing differential axial expansion measurement; and calculating the axial expansion at the blade row by applying a factor to the calculated axial expansion of the rotor, c) after steps a), and b), calculating a relative axial displacement of the stage from a difference between the axial expansion at the vane row of step a) and the axial expansion at the blade row of step b); and providing an alert if allowable tolerances are exceeded.

12. The method of claim 11, further comprising:

establishing a datum point for the axial expansion of the vane row and a datum point for the axial expansion of the blade row; and the additional step of:

d) calculating an absolute axial clearance of a stage by subtracting from, a difference between the datum point of the vane row and the datum point of the blade row, the relative axial expansion of the stage of step c).

13. The method of claim 11, the steam turbine further comprising:

a vane carrier, wherein the vane row is fixed to the inner casing by the vane carrier.

14. The method of claim 13, wherein in step a) using the calculated axial expansion of the inner casing to calculate the axial expansion at the vane row from the calculated axial expansion of the inner casing, includes a multiplication of the calculated axial expansion of the inner casing by a factor ($Fbc1(x)$) that is a function of steam turbine load.

15. The method of claim 11, wherein the estimating of the outer casing axial expansion uses an outer casing absolute axial expansion sensor.

16. The method of claim 11, wherein in step a) and step b) the outer casing axial expansion measurement is estimated at the first end.

17. The method of claim 11, wherein the estimating of the inner to outer casing differential axial expansion uses an inner to outer casing differential axial expansion sensor.

18. The method of claim 11, wherein the estimating of the axial expansion of the rotor uses a rotor to outer casing differential axial expansion sensor.

19. The method of claim 11, wherein in step a) the point of the inner casing between the support arm and the second end is radially adjacent the stage.

20. The method of claim 18, wherein in step b) the calculated axial expansion of the rotor is an absolute axial expansion of the rotor between the first end and the second end.

* * * * *